(12) United States Patent
Taverner et al.

(10) Patent No.: US 7,585,107 B2
(45) Date of Patent: Sep. 8, 2009

(54) CORRECTED DTS MEASUREMENTS BASED ON RAMAN-STOKES SIGNALS

(75) Inventors: Domino Taverner, Delray Beach, FL (US); Trevor MacDougall, Simsbury, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 143 days.

(21) Appl. No.: 11/333,044

(22) Filed: Jan. 17, 2006

(65) Prior Publication Data
US 2007/0165691 A1    Jul. 19, 2007

(51) Int. Cl.
*G01K 1/16* (2006.01)
*G01J 5/00* (2006.01)

(52) U.S. Cl. .................. 374/120; 374/130; 356/43; 356/73.1

(58) Field of Classification Search .............. 374/120, 374/130; 356/43, 73.1
See application file for complete search history.

(56) References Cited

U.S. PATENT DOCUMENTS

| 5,592,282 | A * | 1/1997 | Hartog | 356/44 |
| 7,126,680 | B2 * | 10/2006 | Yamate et al. | 356/73.1 |
| 2003/0234921 | A1 * | 12/2003 | Yamate et al. | 356/73.1 |
| 2006/0153274 | A1 * | 7/2006 | Seebacher | 374/130 |
| 2006/0245468 | A1 * | 11/2006 | Hartog | 374/161 |

FOREIGN PATENT DOCUMENTS

| EP | 1 338 877 | 8/2003 |
| GB | 2 181 830 | 4/1987 |
| GB | 2 400 906 | 10/2004 |
| WO | WO 2004/001357 | 12/2003 |
| WO | WO 2004/029568 | 4/2004 |

OTHER PUBLICATIONS

GB Search Report, Application No. 0625607.7, Dated May 25, 2007.
Sensornet, "Correcting measurements in damaged fibres," www.sensornet.co.uk, Sensonet Tech Talk, Sep. 14, 2004.
Mostafa Ahangrani Farahani et al., "Spontaneous Raman Scattering in Optical Fibers with Modulated Probe Light for Distributed Temperature Raman Remote Sensing," Journal of Lightwave Technology, Aug. 1999 vol. 17(8): pp. 1379-1391.

* cited by examiner

*Primary Examiner*—Gail Verbitsky
*Assistant Examiner*—Megann E Vaughn
(74) *Attorney, Agent, or Firm*—Patterson & Sheridan, LLP (57) ABSTRACT

Methods and apparatus allowing distributed temperature sensing (DTS) measurements to be compensated for differential and/or varying loss between Raman Stokes and anti-Stokes signals are provided. By irradiating an optical waveguide with signals at wavelengths at or near the Raman Stokes and anti-Stokes bands, a distributed loss profile for the waveguide may be generated. This distributed loss profile may be used to adjust the amplitudes or amplitude ratios of Raman Stokes and anti-Stokes signals used in DTS measurements, which may lead to more accurate DTS profiles.

13 Claims, 7 Drawing Sheets

CORRECTED DTS MEASUREMENTS BASED ON RAMAN-STOKES SIGNALS

BACKGROUND OF THE INVENTION

1. Field of the Invention

Embodiments of the present invention generally relate to distributed temperature sensing (DTS) and, more particularly, to correcting DTS measurements based on distributed loss measurements.

2. Description of the Related Art

Distributed Temperature Sensing (DTS) is a technique of monitoring temperature along the length of a wellbore utilizing an optical waveguide, such as an optical fiber, as a temperature sensor. In a typical DTS system, a laser or other light source at the surface of the well transmits a pulse of light into a fiber optic cable installed along the length of a well. Due to interactions with molecular vibrations within the glass of the fiber, a portion of the light is scattered back towards the surface (this phenomenon is referred to as Raman scattering).

Figure 1:
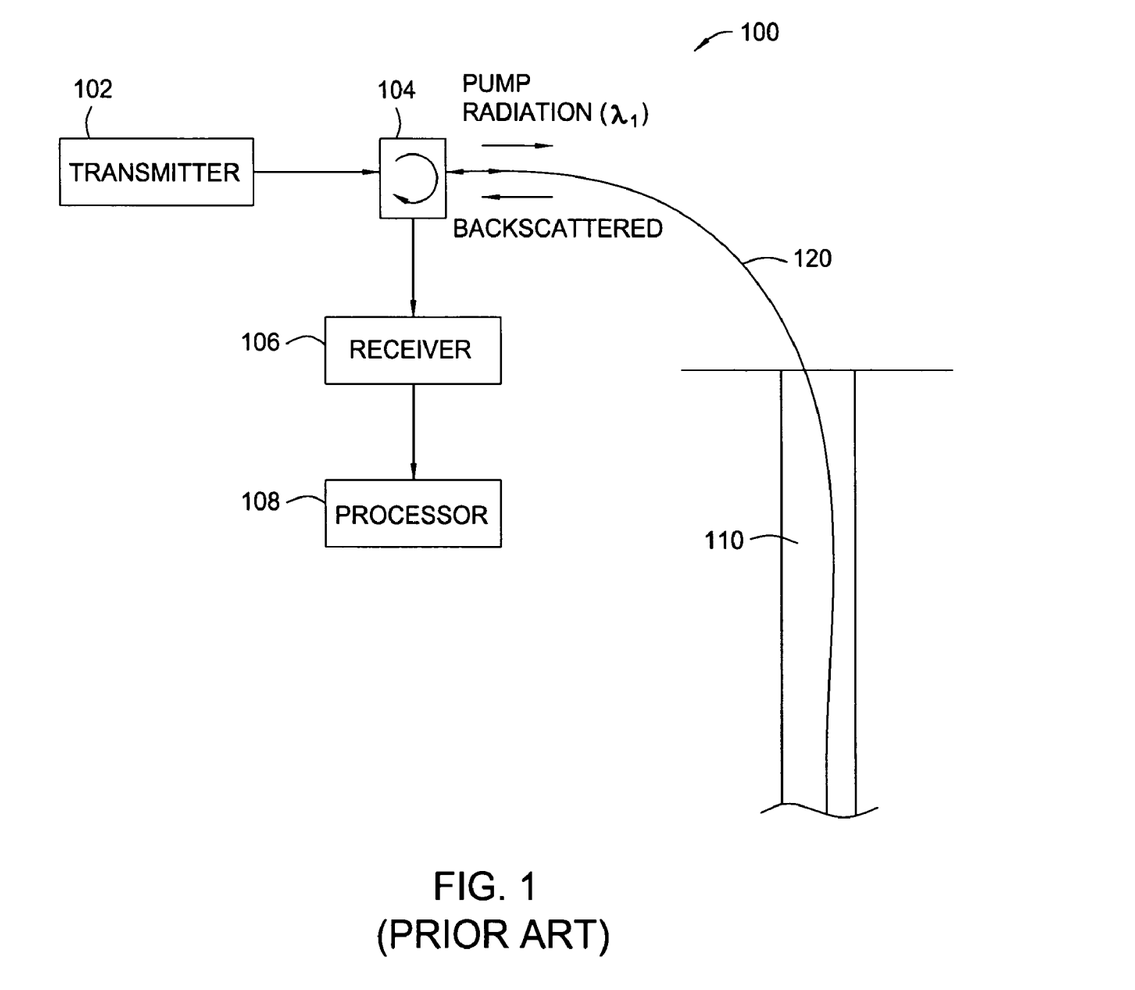
FIG. 1 illustrates a conventional distributed temperature sensing (DTS) system.

FIG. 1 illustrates a conventional DTS system 100 for measuring the temperature in a well bore 110. A transmitter 102 irradiates a waveguide 120 with light signals (pump radiation) capable of causing Raman scattering. A coupler 104 includes suitable optical elements to guide pump radiation down the waveguide 120 and guide backscattered light signals to a receiver 106. The receiver 106 translates the backscattered light signals into electrical signals that are fed to a processor 108 capable of generating a distributed temperature profile therefrom.

Figure 2:
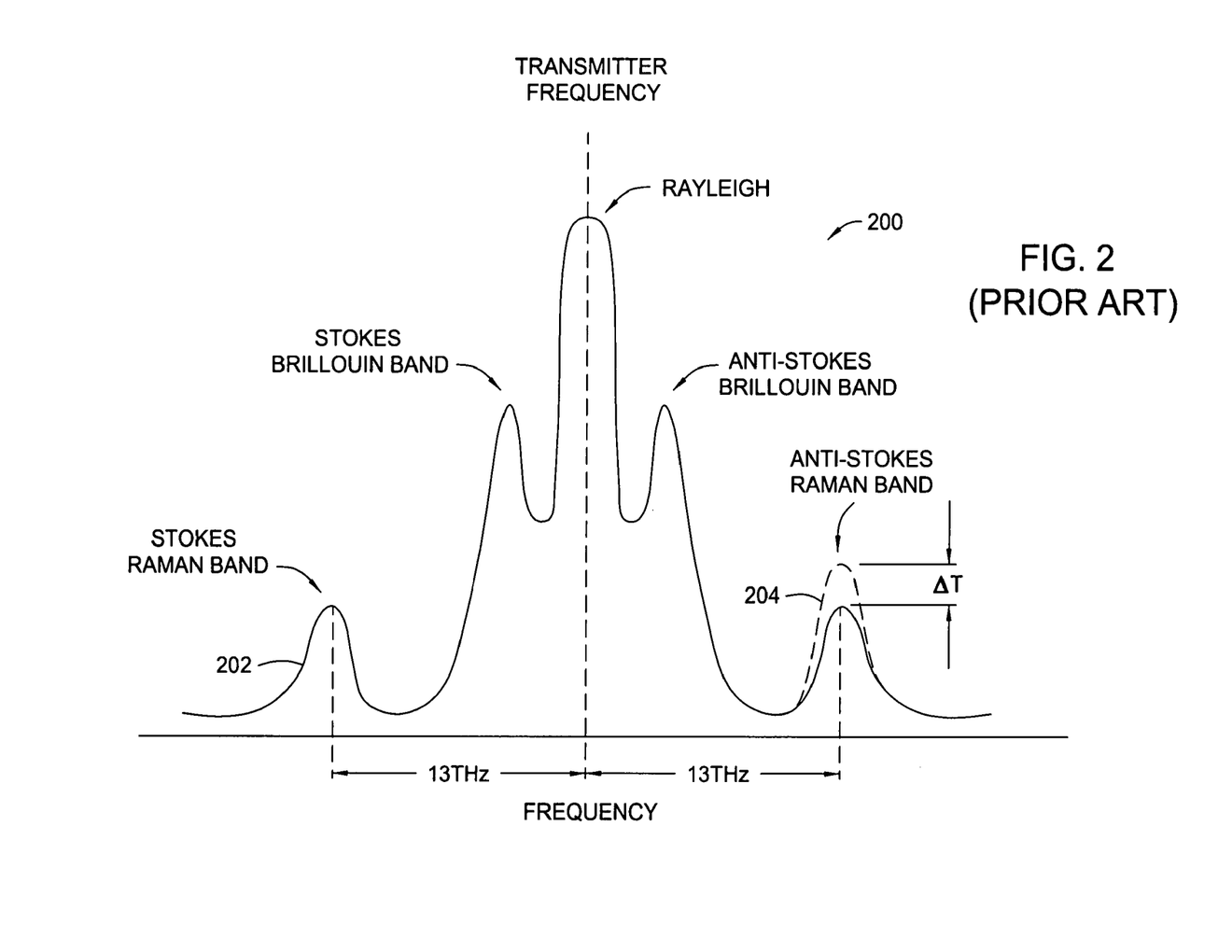
FIG. 2 illustrates exemplary signals generated by Raman scattering.

FIG. 2 illustrates a waveform 202 across a spectrum of backscattered light signals generated by the pump radiation. As illustrated, the backscattered signals include signals in Brillouin Stokes and anti-Stokes bands, as well as Raman Stokes and anti-Stokes bands. The Raman Stokes and anti-Stokes signals are typically processed by the processor 108 at the surface to calculate a ratio of power between upper and lower frequency bands of detected signals.

There is a known temperature dependence of this ratio which allows for convenient temperature sensing based on the detected light signals scattered to the surface. The Raman anti-Stokes signal is sensitive to temperature changes, which result in changes of amplitude of the Raman anti-Stokes signal (as illustrated by the dashed line 204), while the Raman Stokes signal is insensitive to temperature. Because speed of light in the waveguide 120 is known, it is possible to determine positions along the fiber at which scattering occurred, based on the time of arrival of the backscattered light signals. Hence, a Raman DTS system is capable of measuring temperature as a continuous function of position over a length of the fiber, which may be correlated to a depth of the wellbore.

Unfortunately, DTS systems based on Raman scattering in an optical waveguide are susceptible to measurement errors due to differential (and/or varying) loss between the Stokes and anti-Stokes generated signals. In other words, due to this differential loss, the ratio calculated by the processor may not be accurate. The differential loss can be caused by any combination of several factors including uneven draw conditions resulting in variations along a fiber, environmental conditions such as hydrogen ingress, and installation conditions such as bending in the fiber that result in different optical responses at the Raman Stokes and anti-Stokes frequency bands.

This loss difference can be significant due to the large frequency separation of these two signals, which may be several THz (e.g., approximately 26 THz) in silica based optical fibers often used in downhole applications. While calibration for these differences may be carried out under some initial test conditions, these test conditions often bare little resemblance to the actual installation conditions. As an example, while a DTS system with several kilometers of fiber may be installed downhole, calibration is typically performed with the fiber on a spool in a temperature controlled oven.

Therefore, techniques and apparatus for correcting errors in DTS measurements caused by differential loss between Raman Stokes and anti-Stokes signals are needed.

SUMMARY OF THE INVENTION

The present invention generally techniques and apparatus for correcting errors in DTS measurements caused by differential loss between Stokes and anti-Stokes signals.

One embodiment provides a method of generating a distributed temperature sensing (DTS) profile for an optical waveguide. The method generally includes irradiating the waveguide with a first light signal at a first frequency such that the waveguide generates Raman Stokes and Raman anti-Stokes signals in response, irradiating the waveguide with second and third light signals at a second and third frequencies, respectively, calculating a differential loss between the second and third frequencies at different points along the waveguide, based on reflected signals generated in response to the second and third light signals, and calculating a distributed temperature sensor (DTS) profile for the waveguide based on amplitudes of the Raman Stokes and Raman anti-Stokes signals and the distributed loss calculations.

Another embodiment provides an apparatus for sensing temperature along an optical waveguide generally including at least a first light transmitter and processing circuitry. The at least a first light transmitter is for irradiating the waveguide with a first light signal at a first frequency, a second light signal at a second frequency, and a third light signal at a third frequency. The processing circuitry is generally configured to calculate a distributed temperature sensor (DTS) profile based on backscattered Raman Stokes and anti-Stokes signals generated in response to the first light signal and to compensate the DTS profile based on backscattered signals generated in response to the second and third light signals.

Another embodiment provides a system for measuring temperature in a wellbore. The system generally includes an optical waveguide disposed in the wellbore means for irradiating the waveguide with a first light signal having a first frequency suitable to cause backscattered Raman Stokes and anti-Stokes signals, means for irradiating the waveguide with a second light signal having a second frequency at or near a frequency band of the Raman Stokes signals, means for irradiating the waveguide with a third light signal having a third frequency at or near a frequency band of the Raman anti-Stokes signals, and processing circuitry. The processing circuitry is generally configured to calculate a temperature at one or more positions along the wellbore based on the backscattered Raman Stokes and anti-Stokes signals generated in response to the first light signal and backscattered signals generated in response to the second and third light signals.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention allow DTS measurements to be compensated for differential and/or varying loss between Raman Stokes and anti-Stokes signals. By irradiating an optical waveguide with signals at wavelengths at or near the Raman Stokes and anti-Stokes bands, a distributed loss profile for the waveguide may be generated. This distributed loss profile may be used to adjust the amplitudes or amplitude ratios of Raman Stokes and anti-Stokes signals used in DTS measurements, which may lead to more accurate DTS profiles.

The techniques described herein may be used in any type of DTS system, in various applications. To facilitate understanding, however, embodiments of the present invention will be described with reference to DTS systems utilized to measure temperature at various downhole locations along a wellbore as a specific, but not limiting example.

Correcting DTS Profiles Based on Differntial Loss Measurements

Figure 3:
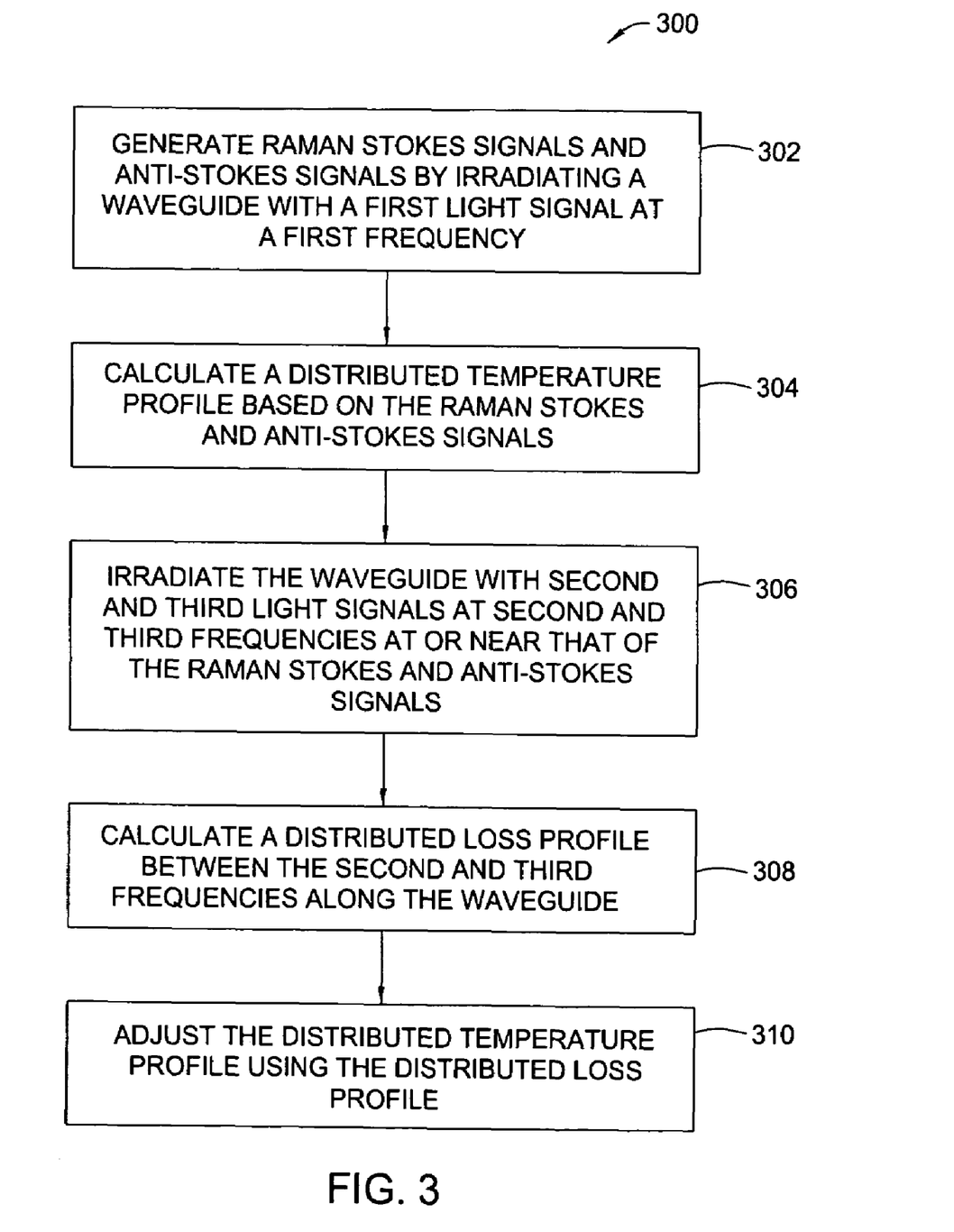
FIG. 3 is a flow diagram of exemplary operations for correcting DTS measurements, in accordance with embodiments of the present invention.

Exemplary operations for correcting a DTS profile based on differential loss measurements are shown in the flow diagram of FIG. 3. The operations may be performed by any suitable components, such as those shown in the DTS systems illustrated in FIGS. 4 and 5, which are described in detail below. The illustrated order of the operations is exemplary only and particular operations may be performed in a different order for some embodiments. For example, a distributed loss profile may be calculated prior to calculating a DTS profile. Further, because the distributed loss profile may change at a slower rate that the DTS profile, loss measurement calculations may be performed less often than DTS measurement calculations.

At step 302, a waveguide is irradiated with a light signal at a first frequency such that the waveguide generates Raman Stokes and Raman anti-Stokes signals. At step 304, a DTS profile is calculated based on the Raman Stokes and Raman anti-Stokes signals. As previously described, the temperature at any point along the waveguide may be determined by the ratio of amplitudes of the Raman Stokes and Raman anti-Stokes signals backscattered from that point. Signals reflected from different points may be distinguished by their arrival time. The DTS calculations may be performed via optical time domain reflectivity (OTDR) or optical frequency domain reflectivity (OFDR) techniques.

At step 306, the waveguide is irradiated with light signals at second and third frequencies at or near the Raman Stokes and Raman anti-Stokes signals, respectively. At step 308, a distributed loss profile of the waveguide is calculated based on reflected signals generated by the light signals at the second and third frequencies. As with the DTS calculations, the distributed loss profile calculations may be performed via OTDR or optical frequency domain reflectivity OFDR. While there may be an advantage to utilizing the same technique as used for the DTS calculations, in terms of reusing hardware and/or software components, different techniques may be for the DTS and distributed loss profiles may be used.

At step 310, the DTS profile is adjusted using the distributed loss profile. In other words, while DTS systems based on Raman scattering are susceptible to measurement errors due to differential loss between the Stokes and anti-Stokes generated signals, the distributed loss calculations may be used to correct these errors. For example, distributed loss calculations at each point may be used to adjust the amplitude ratio of Raman stokes and Raman anti-Stokes signals used in the corresponding individual temperature calculations of the DTS profile, which may lead to more accurate DTS profiles.

Distributed loss profile measurements may be used to correct DTS profile measurements in a number of different manners. For example, for some embodiments, individual Raman Stokes and anti-Stokes amplitude measurements or amplitude ratios taken at particular points may be adjusted based on the differential loss measurements at those points. The adjusted amplitude or amplitude ratios may then be used in calculating the temperature at each point. For other embodiments, rather than adjust amplitude or amplitude ratios in a separate calculation, differential loss between Raman Stokes and Raman anti-Stokes signals may be factored into the temperature calculation at a particular point.

For example, a coefficient of differential loss ($\Delta\alpha$) between Stokes (S) and anti-Stokes (AS) signals may be incorporated in the following equation used to calculate temperature at a given point along a waveguide ($z_q$):

$$T(z_q) = \frac{\Delta E}{k \ln\left[\frac{h_{S,Re}(z_q)}{h_{AS,Re}(z_q)} \frac{R_{AS}}{R_S} \frac{a_{AS}}{a_S} \left(\frac{\lambda_S}{\lambda_{AS}}\right)^4 e^{(\Delta\alpha_p \cdot z_q)}\right]}$$

where $\Delta E$ is the energy difference between photons at Stokes and anti-Stokes wavelengths, k is the Boltzman constant, h is the discrete pulse response of the Stokes and anti-Stokes scattering, R is a photodiode responsivity, $\lambda$ is the wavelength of the Stokes and anti-Stokes signals, and a is the attenuation of the Stokes and anti-Stokes signals in the receiver circuitry.

For an attenuation that varies with distance along the fiber, the following replacement may be made:

$$\Delta\alpha_p \cdot z_p \rightarrow \int_0^{z_q} \Delta\alpha(z)dz, \text{ where}$$

$$\Delta\alpha(z) = \alpha_{AS}(z) - \alpha_S(z)$$

and $\alpha_{AS}$, $\alpha_s$ are the attenuation coefficients at the anti-Stokes and Stokes wavelengths. These attenuation coefficients may be obtained, for example, from OTDR or OFDR loss measurements taken at, or close to, the Raman Stokes and anti-Stokes wavelengths.

Exemplary DTS Systems

Figure 4:
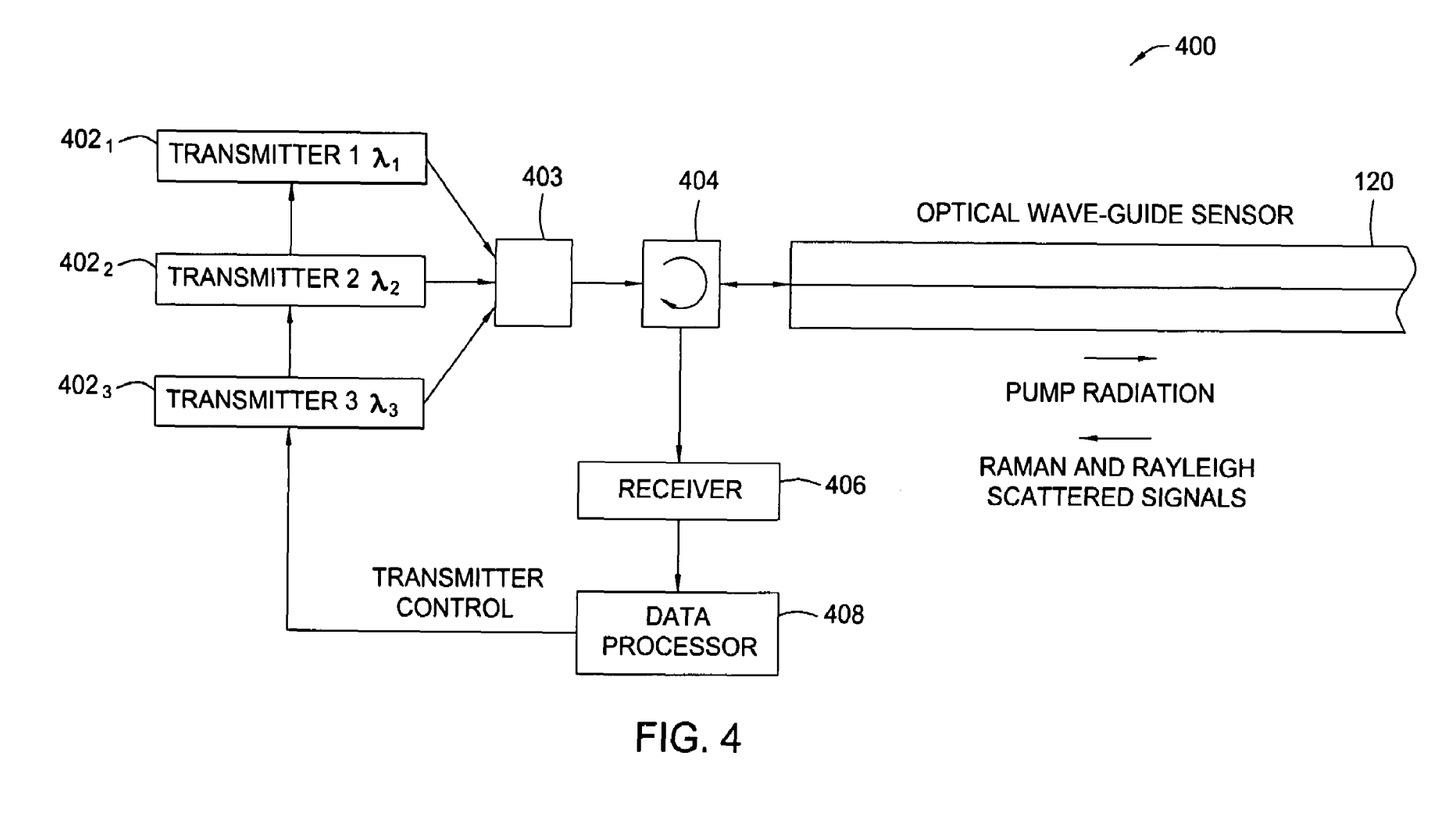
FIG. 4 illustrates an exemplary DTS system, in accordance with embodiments of the present invention.
Figure 5:
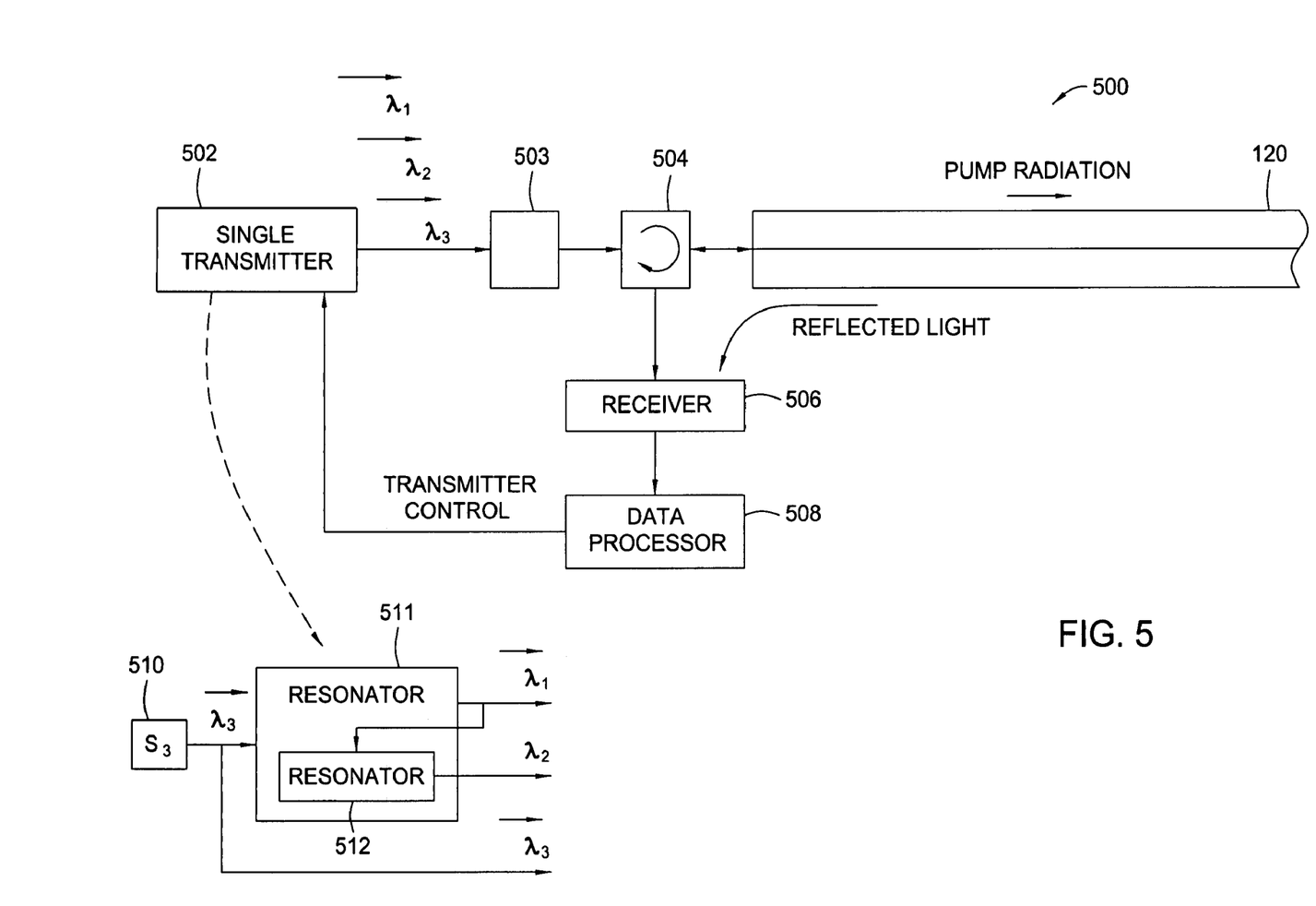
FIG. 5 illustrates another exemplary DTS system, in accordance with embodiments of the present invention.

FIGS. 4 and 5 illustrate exemplary DTS systems capable of calculating DTS profiles, compensated based on loss measurements taken at, or close to, the Raman Stokes and anti-Stokes wavelengths. Referring first to FIG. 4, a DTS system 400 utilizing separate transmitters $402_1$, $402_2$, and $402_3$ to irradiate a waveguide 120 with light signals at different wavelengths is illustrated. The waveguide 120 may comprise any type waveguide suitable for DTS measurements, such as a silica based optical fiber.

The first transmitter $402_1$, may generate a light signal at a wavelength that causes Raman scattering, allowing for DTS measurements from the Raman Stokes and anti-Stokes signals generated thereby. The second and third transmitters $402_{2-3}$ may generate light signals at or near the Raman Stokes and anti-Stokes signals, respectively, allowing differential loss measurements that may be used to correct the DTS measurements, as previously described. The light signals at the different wavelengths may be generated at the same or different optical power levels. A coupler 404 may include suitable optical elements to guide pump radiation from the transmitters $402_{1-3}$ down the waveguide 120 and guide backscattered light signals to a receiver 406.

A processor 408 may be configured (programmed) to calculate a DTS profile, compensated for distributed loss measurements, based on backscattered signals received by the receiver 406, in response to the light signals generated by the transmitters $402_{1-3}$. As illustrated, the processor 408 may also control the transmitters $402_{1-3}$ to irradiate the waveguide in a controlled manner based on the measurement technique (e.g., OTDR and/or OFDR) employed.

For example, to avoid signal interference, the processor 408 may be configured to power down the first transmitter $402_1$, when performing distributed loss measurements, utilizing transmitters $402_{2-3}$. On the other hand, if the amplitude of the Raman Stokes and anti-Stokes signals generated in response to irradiation by the first transmitter $402_1$, is sufficiently small relative to reflected signals generated in response to irradiation by the by the second and third transmitters $402_{2-3}$ for distributed loss measurements, the first transmitter may remain on continuously, while the second and third transmitters may be powered down while taking DTS measurements. Optional filter circuitry 403 may be included to selectively apply or block any number of the different light signals to take measurements, depending on the particular measurement techniques employed instead of, or in addition to, powering on and off transmitters.

For some embodiments, rather than have separate transmitters to generate the light signals at each wavelength, a single transmitter may be configured to generate light signals at multiple wavelengths. For example, as illustrated in FIG. 5, a DTS system 500 may utilize a single transmitter 502 to generate light signals at three different wavelengths. Filter circuitry 503 may be included to selectively block or apply any number the different light signals to the waveguide 120 via a coupler 504. A processor 508 may be configured to calculate a DTS profile, corrected based on differential loss measurements, based on signals received at a receiver 506, as described above.

The transmitter 502 may include any suitable components to generate the light signals at different wavelengths. As an example, the transmitter 502 may include a laser 510 to generate a signal with a wavelength ($\lambda_3$) at or near the Raman anti-Stokes band. A first (Raman laser) resonator cavity 511 may be configured to generate a light signal with a wavelength ($\lambda_1$) suitable to generate Raman Stokes and anti-Stokes signals, while a second resonator cavity 512 may be configured to generate a light signal with a wavelength ($\lambda_2$) at or near the Raman Stokes band.

Figure 6:
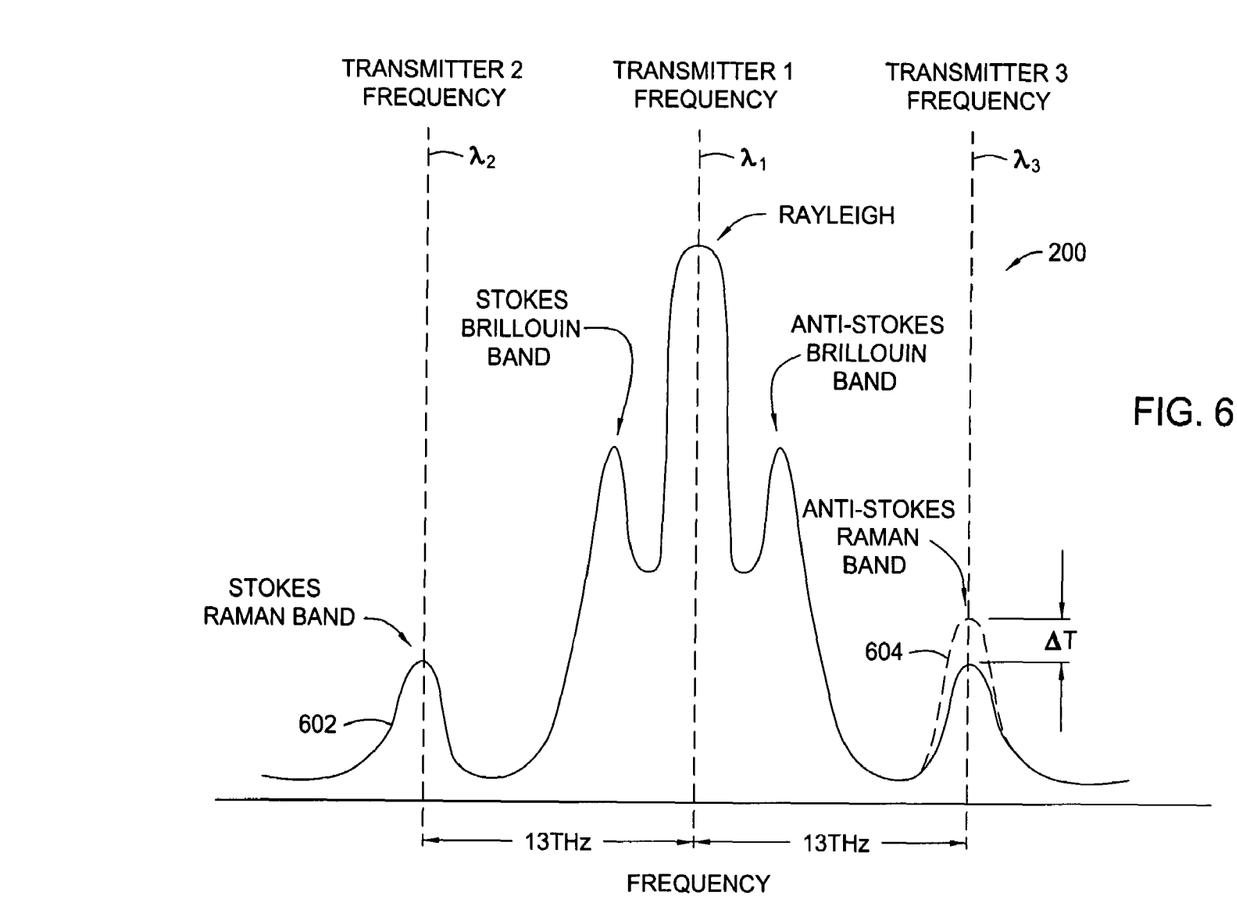
FIG. 6 illustrates exemplary signals generated by Raman scattering and frequencies of signals used for differential loss measurements, in accordance with one embodiment of the present invention.
Figure 7:
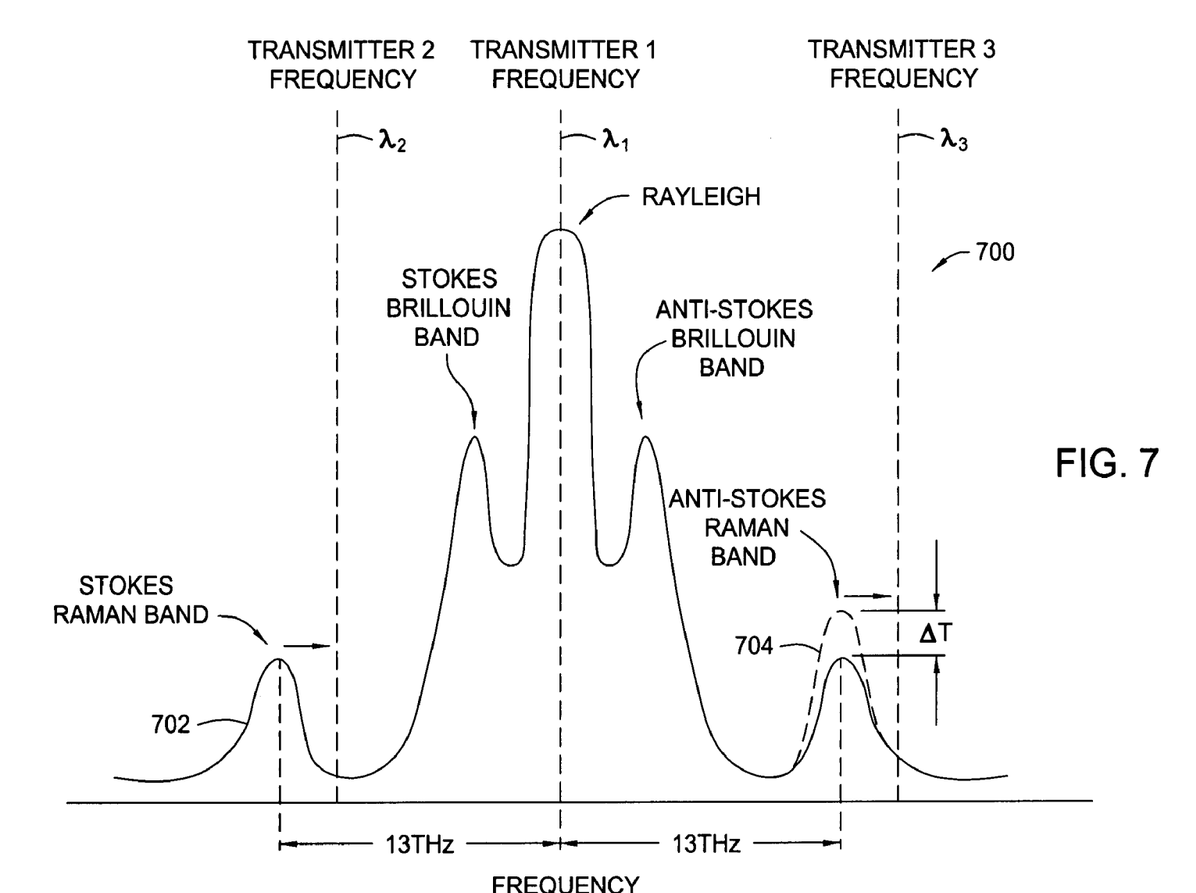
FIG. 7 illustrates exemplary signals generated by Raman scattering and frequencies of signals used for differential loss measurements, in accordance with another embodiment of the present invention.

FIGS. 6 and 7 are diagrams of exemplary signal wavelengths ($\lambda_1$, $\lambda_2$, and $\lambda_3$) relative to the scattered light spectrum generated in response to the first transmitter signal (at wavelength $\lambda_1$). Recall that since the amplitude of the Raman anti-Stokes signal is sensitive to temperature, while the amplitude of the Raman Stokes signal is insensitive to temperature, the ratio of these amplitudes may be used to calculate temperature, but that the measured amplitude ratio may be erroneous due to differential loss between these two signal bands.

As illustrated in FIG. 6, the second and third wavelengths ($\lambda_2$ and $\lambda_3$) may fall within the Raman Stokes and anti-Stokes bands, respectively. As a result, the differential loss between these wavelengths may be calculated at each point along the fiber, and used to increase the accuracy of amplitude ratios of the Raman Stokes and anti-Stokes signals used in calculating the DTS profile, as described above. As previously described, it may be necessary to remove the first signal (e.g., via filtering or by powering down a separate transmitter) in order to perform the differential loss calculations, depending on the relative power of the signals, in order to prevent interference.

As illustrated in FIG. 7, the second and third wavelengths may alternatively be moved just outside the Raman Stokes and anti-Stokes bands. Moving the second and third signals outside the Raman Stokes and anti-Stokes signal bands may also prevent interference, while allowing simultaneous DTS and differential loss measurements, which may simplify measurements. By moving the second and third wavelengths just outside the Raman Stokes and anti-Stokes bands, as illustrated, differential loss calculated based on signals reflected thereby may very closely estimate differential loss between the Raman Stokes and anti-Stokes wavelengths used in the DTS calculations.

While the foregoing is directed to embodiments of the present invention, other and further embodiments of the invention may be devised without departing from the basic scope thereof, and the scope thereof is determined by the claims that follow.

We claim:

1. A method of generating a distributed temperature sensing (DTS) profile for an optical waveguide, comprising:
    irradiating the waveguide with a first light signal at a first frequency such that the waveguide generates the Raman Stokes and Raman anti-Stokes signals in response;
    irradiating the waveguide with second and third light signals at second and third frequencies, wherein the second and third frequencies have different values;
    generating the first and second light signals based on the third light signal;
    calculating a differential loss between the second and third frequencies at different points along the waveguide, based on reflected signals generated in response to the second and third light signals; and
    calculating a distributed temperature sensor (DTS) profile for the waveguide based on amplitudes of the Raman Stoke and Raman anti-Stokes signals and the differential loss calculations.

2. The method of claim 1, wherein the second and third frequencies are at or near frequency bands of the Raman Stokes and Raman anti-Stokes signals.

3. The method of claim 1, wherein the first and second light signals are generated by resonator cavities.

4. The method of claim 1, wherein the waveguide is irradiated with the second and third light signals while irradiating the waveguide with the first light signal.

5. The method of claim 1, comprising calculating the differential loss via optical frequency domain reflectivity techniques.

6. The method of claim 1, comprising calculating the differential loss via optical time domain reflectivity techniques.

7. An apparatus for sensing temperature along an optical waveguide, comprising:
- at least a first light transmitter for irradiating the waveguide with a first light signal at a first frequency, a second light signal at a second frequency, and a third light signal at a third frequency, wherein the second and third frequencies have different values, and wherein the at least a first light transmitter comprises:
- a light source to generate the third light signal; and
- resonator cavities to generate the first and second light signals based on the third light signal; and
- processing circuitry configured to calculate a distributed temperature sensor (DTS) profile based on backscattered Raman Stokes and anti-Stokes signals generated in response to the first light signal and to compensate the DTS profile based on backscattered signals generated in response to the second and third light signals.

8. The apparatus of claim 7, wherein:
- the second frequency is at or near a frequency band of the Raman Stokes signals; and
- the third frequency is at or near a frequency band of the Raman anti-Stokes signals.

9. The apparatus of claim 7, wherein the processing circuitry is configured to compensate the DTS profile by:
- calculating differential loss coefficients based on the backscattered signals generated in response to the second and third light signals; and
- calculating the DTS profile based on an equation involving the differential loss coefficients.

10. A system for measuring temperature in a wellbore, comprising:
- an optical waveguide disposed in the wellbore;
- means for irradiating the waveguide with a first light signal having a first frequency suitable to cause backscattered Raman Stokes and anti-Stokes signals;
- means for irradiating the waveguide with a second light signal having a second frequency near a frequency band of the Raman Stokes signals;
- means for irradiating the waveguide with a third light signal having a third frequency near a frequency band of the Raman anti-Stokes signals, wherein the second and third frequencies lie outside frequency bands of the Raman Stokes and Raman anti-Stokes signals; and
- processing circuitry configured to calculate a temperature at one or more positions along the wellbore based on the backscattered Raman Stokes and anti-Stokes signals generated in response to the first light signal and backscattered signals generated in response to the second and third light signals.

11. The system of claim 10, wherein the processor is configured to:
- calculate one or more differential loss coefficients based on backscattered signals generated in response to the second and third light signals; and
- calculate the temperature at a position in the wellbore based on Raman Stokes and anti-Stokes signals and the calculated differential loss coefficients.

12. The system of claim 10, wherein the means for irradiating the waveguide with the first, second, and third light signals comprise at least two separate light transmitters.

13. The system of claim 12, wherein the processor is configured to power down a first transmitter for generating the first light signal prior to irradiating the waveguide with the second and third light signals.

* * * * *